Sept. 27, 1955  J. A. LASATER ET AL  2,718,679
TURRET DRIVE FACILITIES FOR MOLD ASSEMBLING INSTALLATION
Filed July 16, 1952  8 Sheets-Sheet 2
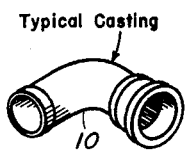
Typical Casting
Fig. 2.
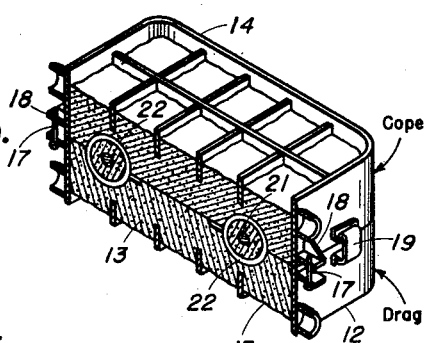
Fig. 5.
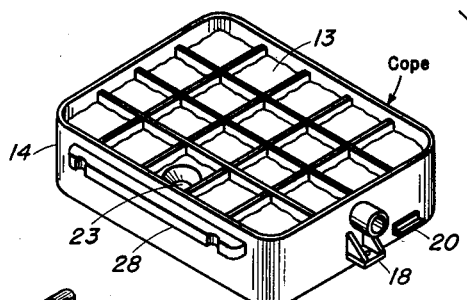
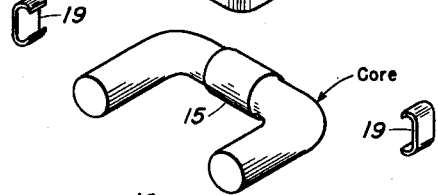
Fig. 3.
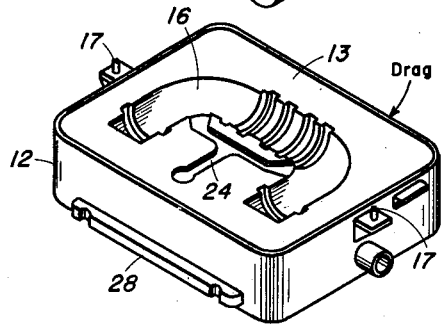
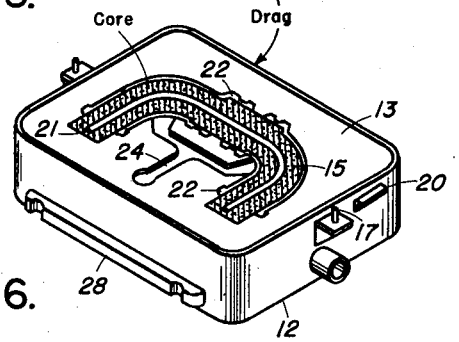
Fig. 4.
Fig. 6.
Fig. 7.
INVENTORS
John A. Lasater
Thomas A. Deakins
BY
C. F. Bryant
ATTORNEY Sept. 27, 1955   J. A. LASATER ET AL   2,718,679
TURRET DRIVE FACILITIES FOR MOLD ASSEMBLING INSTALLATION
Filed July 16, 1952   8 Sheets-Sheet 3

INVENTORS
John A. Lasater
Thomas A. Deakins
BY C. F. Bryant
ATTORNEY

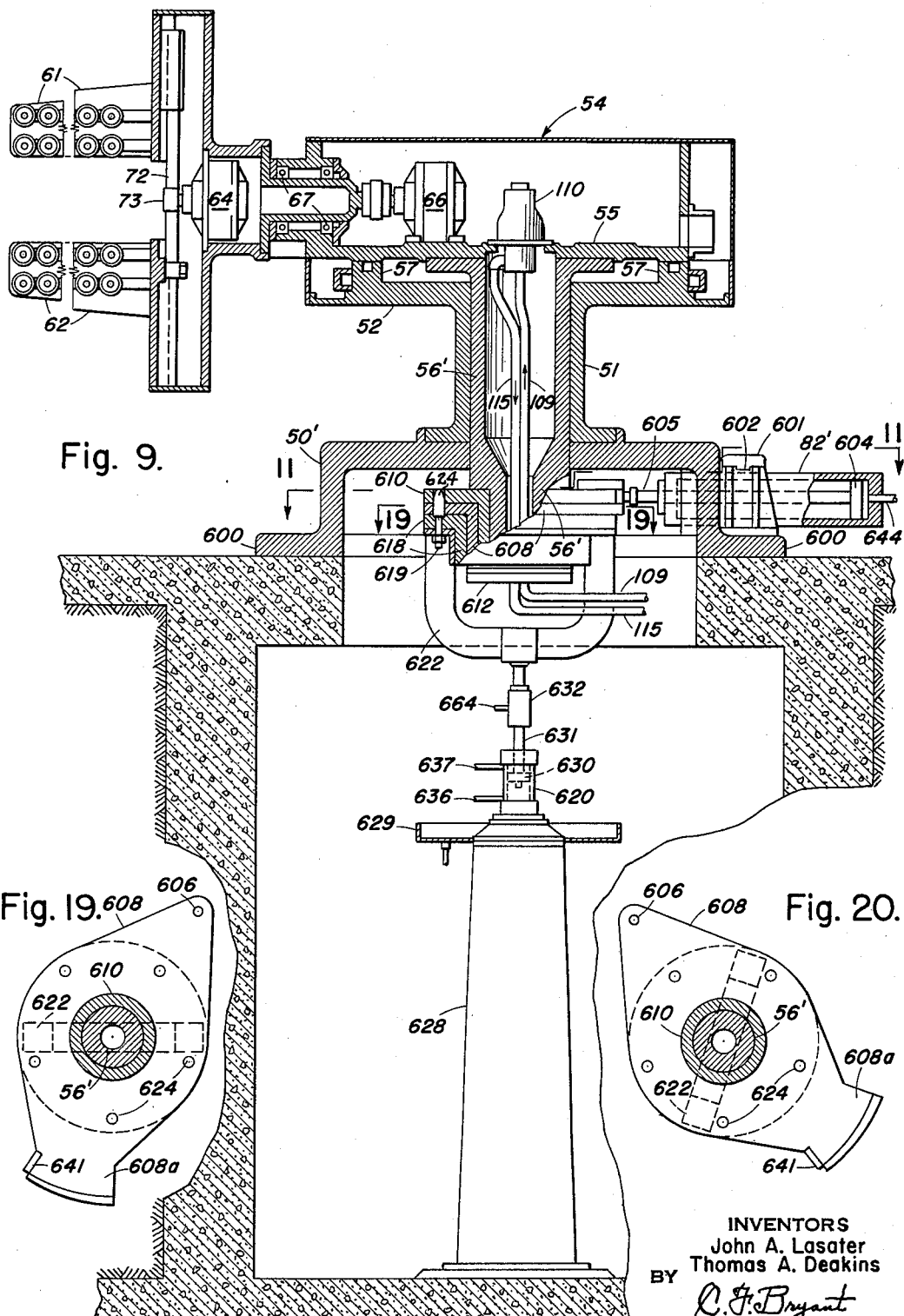

Sept. 27, 1955     J. A. LASATER ET AL     2,718,679
TURRET DRIVE FACILITIES FOR MOLD ASSEMBLING INSTALLATION
Filed July 16, 1952                          8 Sheets-Sheet 6
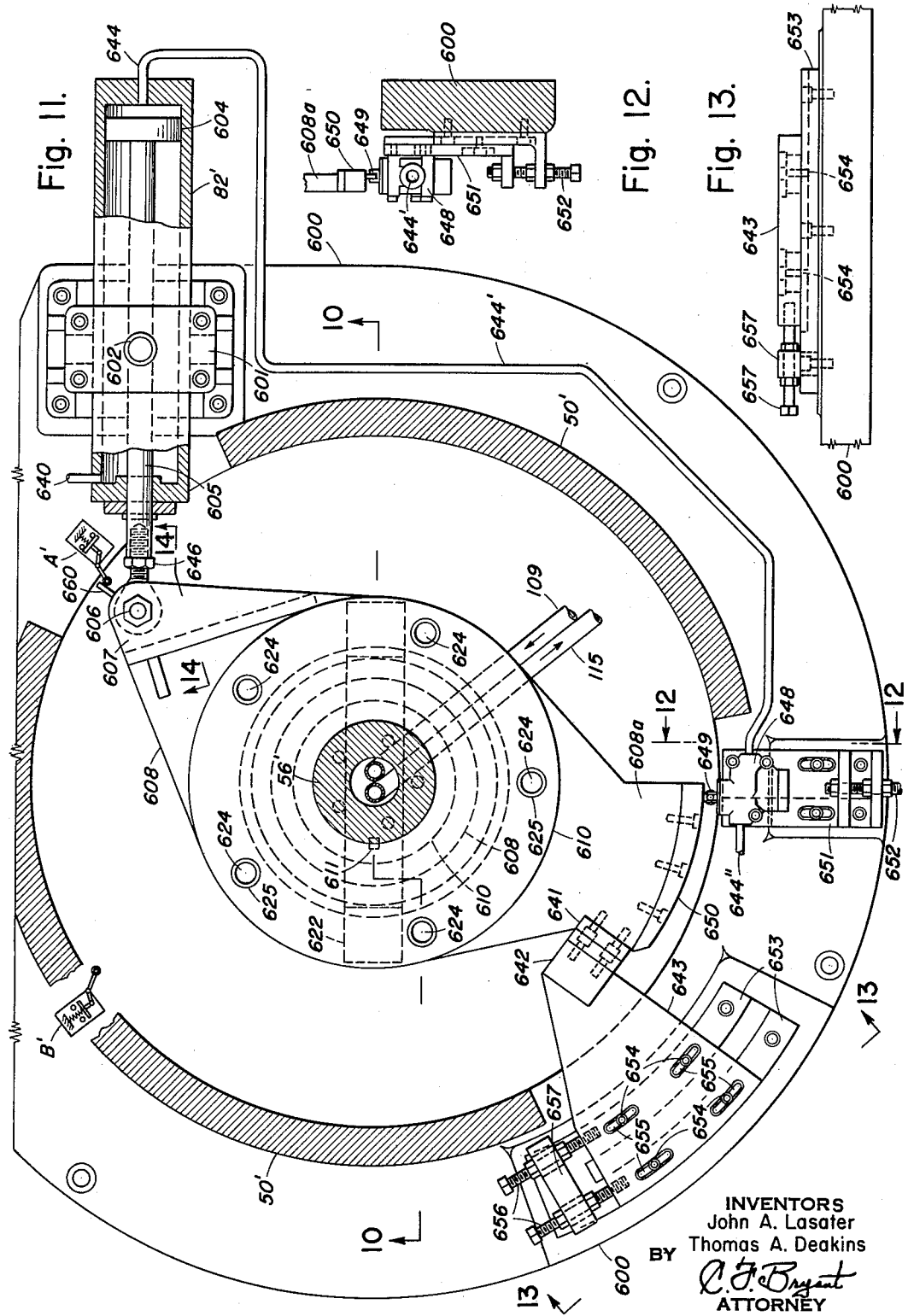
INVENTORS
John A. Lasater
Thomas A. Deakins
BY C. F. Bryant
ATTORNEY

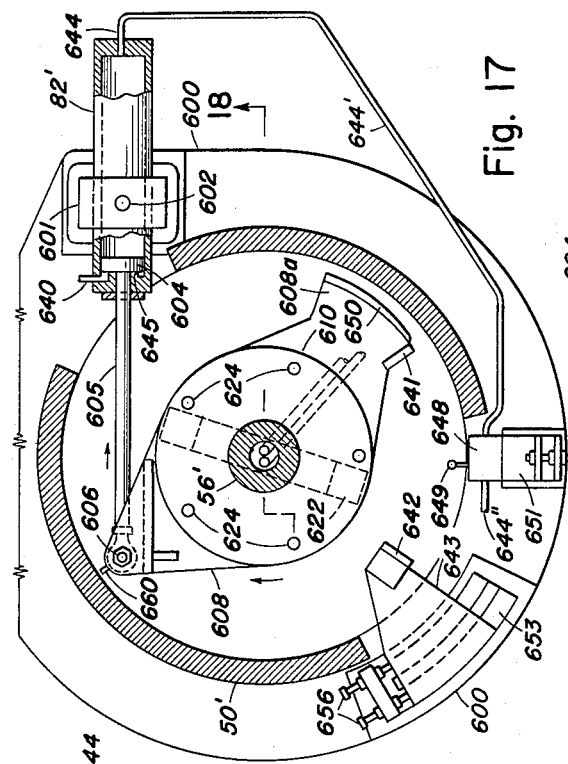
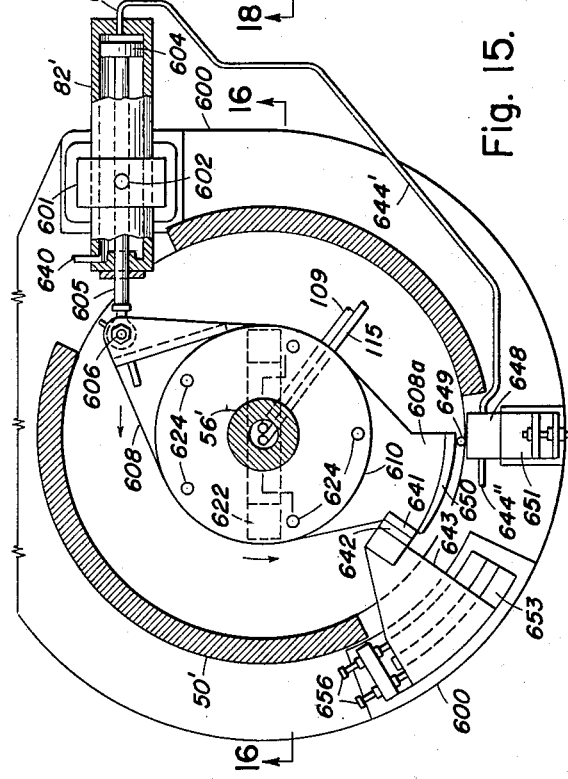
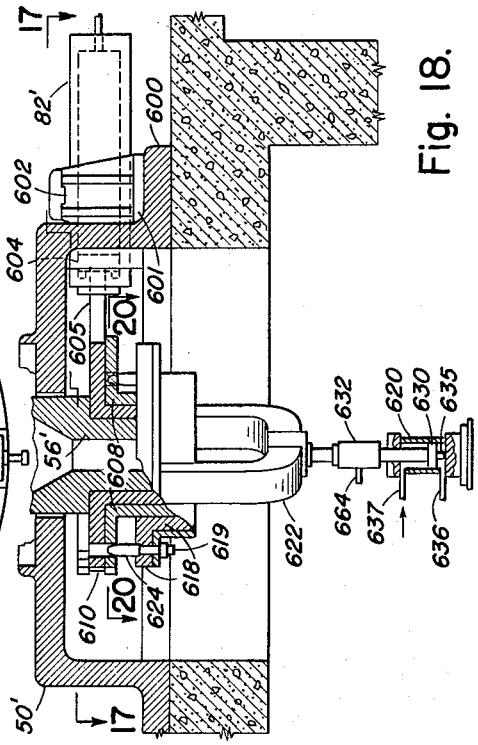
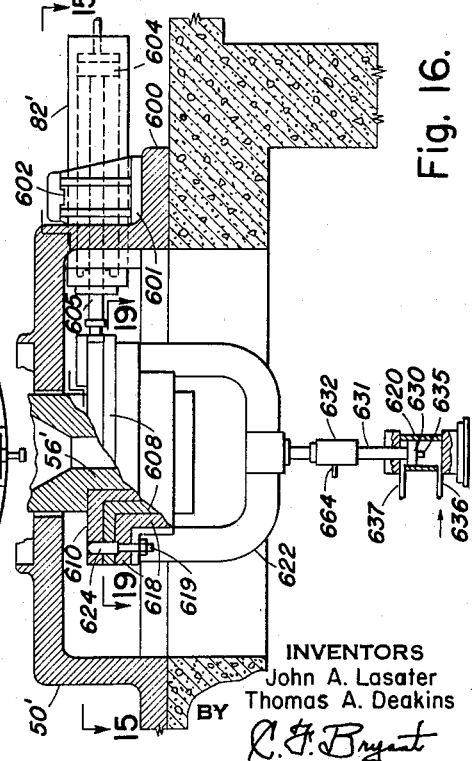

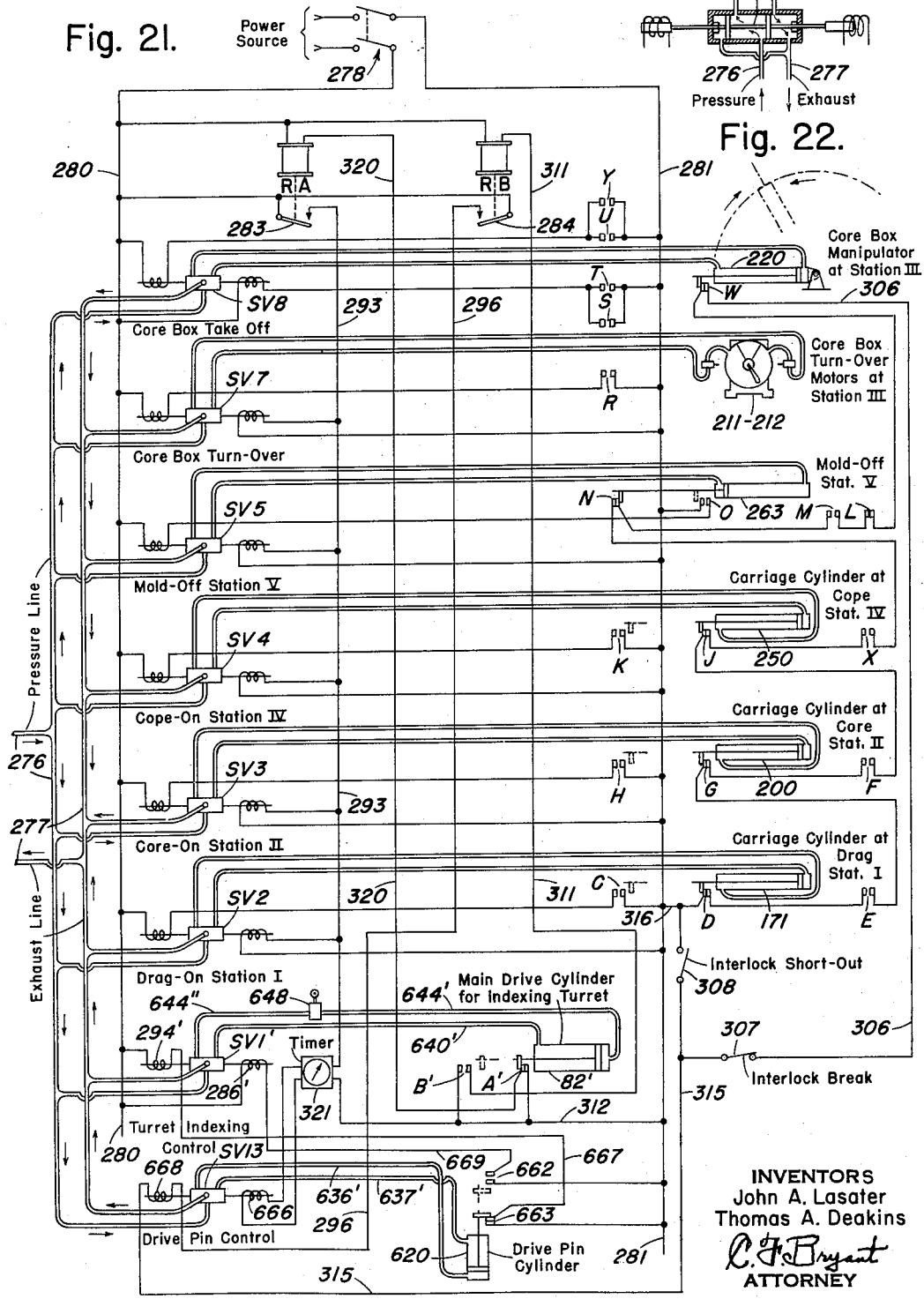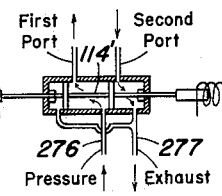

United States Patent Office 2,718,679
Patented Sept. 27, 1955

2,718,679

TURRET DRIVE FACILITIES FOR MOLD ASSEMBLING INSTALLATION

John A. Lasater and Thomas A. Deakins, Chattanooga, Tenn., assignors to Combustion Engineering, Inc., New York, N. Y., a corporation of Delaware Application July 16, 1952, Serial No. 299,272

8 Claims. (Cl. 22—31)

This invention relates to the assembly of foundry molds by mechanized means such as are disclosed by copending application Serial No. 200,899 on "Apparatus and Technique for Assembling Foundry Molds" filed December 15, 1950 in the names of Samuel C. Northington, Jr. and John A. Lasater.

Broadly stated, the object of our invention is to better the performance of a complete mold assembling installation of the aforesaid mechanized type.

A more specific object is to provide such an installation with improved means for indexing the turret of the central assembling machine following withdrawal of each assembled mold therefrom.

Another object is to increase the operating life and improve the reliability of such mechanism for advancing the turret through successive angular increments each matching the angular spacing between adjacent stations around the central machine.

A further object is to provide unitary indexing mechanism which serves not only to drive the turret in the manner aforesaid but also to slow the end of each drive movement thereof for final stopping of the turret arms in accurate register with the several stations that surround the mold assembling machine.

A still further object is to interlock our new turret drive facilities with the apparatus at each of the installation's individual stations in such manner that indexing movement can be imparted to the turret only when each and every one of said stations is in complete readiness therefor.

Other objects and advantages will become apparent as the disclosure and description hereof proceeds.

One illustrative form of apparatus provided by us for practicing the invention is shown by the accompanying drawings wherein:

Figure 1 is a top plan view showing the turret indexing facilities of our invention applied to a mold assembling installation that is organized in accordance with said Northington-Lasater application Serial 200,899 and that utilizes a central indexing machine surrounded by five cooperating stations which supply the machine with sand charged cope flasks and drag flasks plus green sand cores and which receive therefrom assembled molds ready for pouring;

Figure 2 represents a typical casting which may be produced in a mold that is assembled by the apparatus diagrammed in Figure 1;

Figure 3 is an exploded view showing the components of a typical mold for casting two of the quarterbend soil pipe fittings of Figure 2;

Figure 4 shows how the drag, core and cope of Figure 3 appear after they have been brought together to produce an assembled mold ready for pouring;

Figure 5 is a section in vertical elevation on line 5—5 through the assembled mold of Figure 4;

Figure 6 is a view from line 6—6 of Figure 4 showing the top of the drag and the interior of the core resting in the mold cavity thereof;

Figure 7 is a simplified diagram of the operations that take place at the aforesaid five stations with which the central indexing machine of Figure 1 is provided;

Figure 9 is a comparably enlarged view in vertical section on line 9—9 of Fig. 8 showing the new hydraulic apparatus by which the assembling machine turret is rotated and stopped;

Figure 11 is a section on line 11—11 of Figs. 9 and 10 showing how the indexing flange, drive arm, main drive cylinder and turret stop means appear when viewed from the top;

Figure 12 shows the stop decelerating valve and its adjustable mount as viewed from line 12—12 of Fig. 11;

Figure 13 shows the stop member and its adjustable mount as viewed from line 13—13 of Fig. 11;

Figures 15 and 16 are respective top and sectional side view showings of the drive apparatus at the end of its turret advancing stroke and with the drive pins still engaging the drive arm with the indexing flange;

Figures 17 and 18 are respective top and sectional side view showings of the drive apparatus at end of its piston return stroke and with the arm drive pins disengaged from the indexing flange;

Figure 19 is section on line 19—19 of Figs. 9 and 16 again showing the drive arm at the end of its turret advancing stroke;

Figure 1:
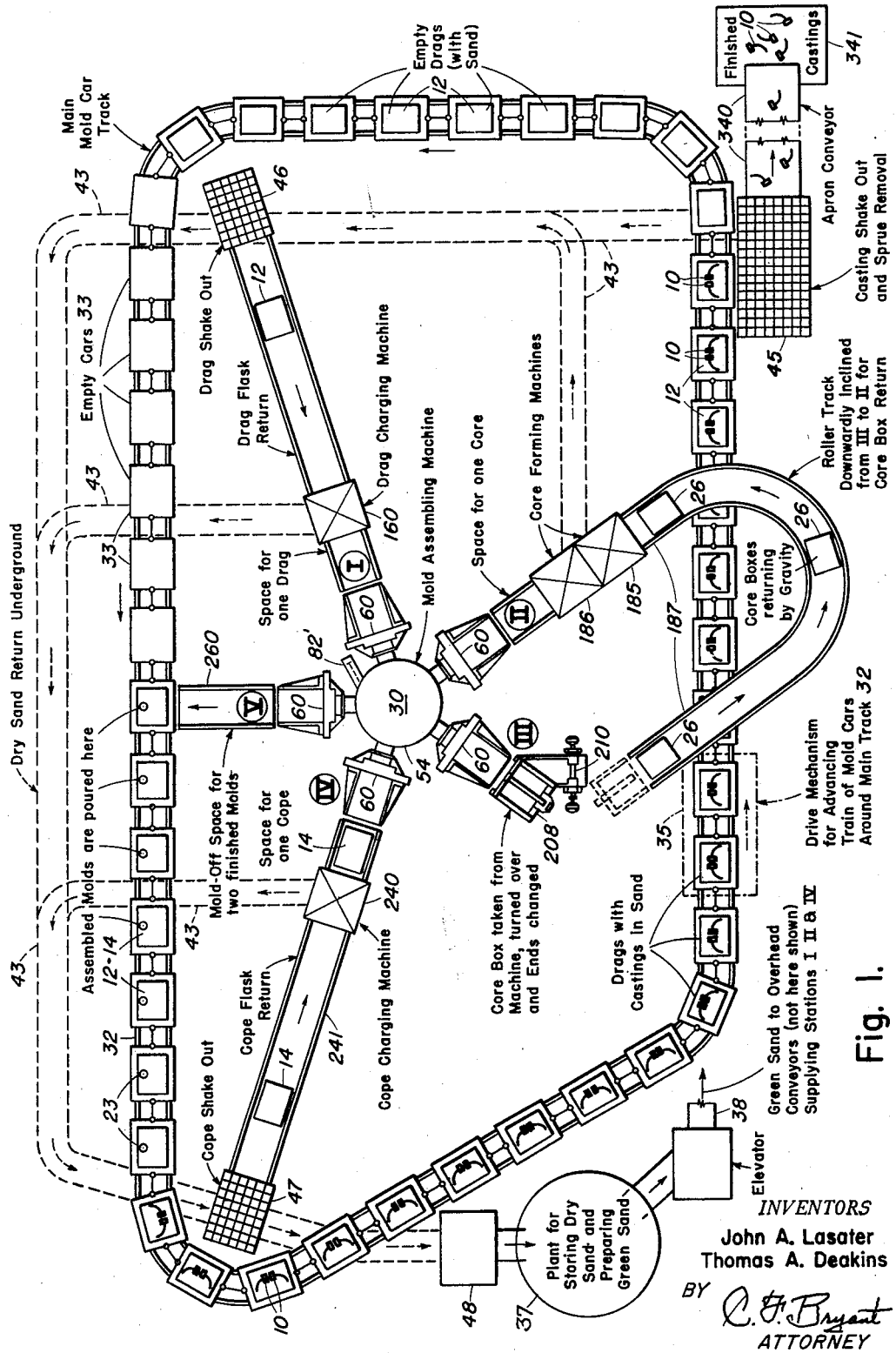

Figure 20 is a section on line 20—20 of Fig. 18 showing how the same drive arm appears when disengaged from the indexing flange and returned through 72° in readiness for re-engagement with said flange preparatory to effecting another 72° advancement of the assembling machine turret;

Figure 21 is a diagrammatic showing of the hydraulic and electrical control circuits utilized to operate our new turret indexing facilities in coordinated relationship with the central assembling machine and its associated station apparatus comprising the complete installation shown by Fig. 1; and Figure 22 shows typical internal construction for each of the solenoid valves utilized in the control system of Fig. 21.

*The mold assembling and casting production practices to be benefitted*

The turret indexing facilities of our invention are here illustratively shown as being applied to mold assembling and casting production apparatus organized as per the aforesaid co-pending Northington-Lasater application Serial 200,899, filed December 15, 1950 under title of "Apparatus and Technique for Assembling Foundry Molds."

That apparatus is suitable for the production of castings having a wide variety of sizes, characters (including solid as well as hollow formation) and shapes. Of these the quarter bend soil pipe elbow represented at 10 in Fig. 3 may be considered as typical. To produce casting such as 10 in static molds of conventional character requires preparation and assembly of the component parts for each mold which are represented in Fig. 3.

These include a lower flask half 12 referred to as the "drag"; an upper flask half 14 referred to as the "cope";

suitable "green" sand 13 or the like packed into both the drag and cope for receiving cavity impressions 16 from the casting pattern (not here shown); and a core 15 ("green" sand or other) placed within the mold cavity to form the hollow interior of casting 10. In the illustration here made the aforesaid casting pattern and co-operating core 15 are both shaped to provide for simultaneously casting two of the quarter bend fittings 10 in each mold 12—14 when assembled as indicated in Fig. 4; and the represented "green" sand core 15 is shown as being provided with a reinforcing arbor indicated at 21 in Figs. 5 and 6.

From Figures 4–5–6 it will be seen that after mold assembly the core 15 rests in cavity 16 of the drag 12; that cope 14 has been lowered upon the drag where it is maintained in accurately aligned relationship by pins 17 upstanding from the drag ends over which are fitted mating brackets 18 attached to the cope ends; and that the two flask halves 12 and 14 are held together by opposing end clamps 19 that engage cooperating lugs 20 on the drag and cope frames.

When so assembled there is provided within the mold interior an open cavity space shown at 22 in Figs. 5–6 into which space there flows molten metal when poured from a ladle (not shown) into the sprue opening 23 (see Figs. 3–4) in the cope sand; said poured metal flowing downwardly through opening 23 and then horizontally through passage 24 (see Figs. 3 and 6) in the drag sand and thence into the aforesaid mold cavity 22 communicating with that passage.

In the aforesaid co-pending Northington-Lasater application Serial 200,899 it is pointed out that preparation of the mold components shown in Fig. 3 involves not only packing sand 13 or the like into the drag flask 12 and cope flask 14 but also accompanying manipulations of a core box required to form the core 15 of Fig. 3 and place it in the cavity 16 of drag 12; that the drag flask 12 and the cope flask 14 each must face down over its pattern half when charged with sand 13 or the like, yet in the finally assembled mold the drag 12 is required to face up as Figs. 4–5–6 show; that the lower core box half (designated as 26 in Fig. 1) must face up while the core 15 is being formed therein, yet roll over thereof along with the drag 12 is a necessary incident to transferring the core 15 from the box half; that the sand-charged cope 14 must thereafter be brought together with this core-carrying drag 12 and secured thereto in order to provide a finished mold (Fig. 4) that is ready for pouring; and that the aforesaid mold components are typically heavy (the assembled mold of Fig. 4 weighing nearly 400 pounds) and cumbersome (said Fig. 4 mold having inside dimensions of 26 inches by 20 inches and being 14 inches tall) and therefore difficult to handle.

*Illustrative mold assembling facilities improvable by our invention*

In accordance with said Northington-Lasater application Serial 200,899 the preparation, manipulation and assembly operations are accomplished mechanically and more or less automatically; mold assembly speed thereby being increased and various other benefits being made available. In Fig. 1 hereof illustrative apparatus for accomplishing such mechanized assembly of the molds is diagrammatically represented as utilizing a central indexing machine 30.

Said central mold assembling machine 30 is equipped with a turret rotatable about a vertical axis and provided with five arm heads 60 spaced circumferentially (72° apart) around the turret. Each of these five arm heads 60 is mounted for roll over about a horizontal axis radial to the turret center; and carried by each head are upper and lower flask receiving arms 61 and 62 (see Fig. 9) that extend outwardly from the head in radial relation to the turret, the upper and lower arms in each of these head sets being adapted for movement towards and away from each other.

The present invention pertains to provision for successively advancing machine 30's central turret 54 through the angular distance (72°) between arm heads 60 whereby each set of upper and lower arms 61—62 progressively occupies at-rest positions spaced around the turret periphery's rotative path at the station locations designated I—II—III—IV—V in Fig. 1. Said turret indexing provision, here mentioned only generally, is described in full detail at a later point in this specification.

At the first or "Drag-On" Station I of Figs. 1 and 7 use is made of drag charging machine 160 and cooperating facilities for inserting into the upper arm of each head 60 there coming to rest a sand charged drag flask 12 (Fig. 3) having its pattern impression 16 facing down.

At the second or "Core-On" Station II of Figs. 1 and 7 there are provided core forming machines 185—186 and cooperating facilities for inserting into the lower arm of each head 60 there coming to rest a core box half 26 having a finished core 15 therein facing up from the box half.

Following Station II is a third or "Core-Box-Off" Station shown at III in Figs. 1 and 7; and cooperating with the turret of central machine 30 are control means responsive to advancement by the turret of each arm head 60 from Station II to Station III for first moving the upper and lower arms 61—62 (see Fig. 9) on that head together thus bringing the core 15 into the drag 12's pattern cavity 16 (Fig. 3) and then rolling said arms through 180° about the head axis thus placing the drag 12 on the bottom and the core 15 on top thereof with the core box half 26 above the core and then moving the two arms away from each other thus lifting the core box half 26 free both of the drag 12 and the core 15 now resting in the drag's pattern impression.

At the aforesaid "Core-Box-Off" Station III is mechanism 208—210 plus cooperating facilities for withdrawing the empty and now inverted core box half 26 out of the upper arm of each turret head 60 there coming to rest, for turning that box half over and interchanging its two ends, and for returning it to "Core-On" Station II via the gravity track 187 of Fig. 1.

At the fourth or "Cope-On" Station IV of Figs. 1 and 7 use is made of cope charging machine 240 and cooperating facilities for inserting into the upper arm of each head 60 there coming to rest a sand charged cope flask 14 (Fig. 3) having its pattern impression facing down.

Following Station IV is a fifth or "Mold-Off" Station shown at V in Figs. 1 and 7; and cooperating with the turret of central machine 30 are control means responsive to advancement by the turret of each arm head 60 from Station IV to Station V for moving the upper and lower arms of that head together thus bringing the cope 14 together with the drag 12 with the cope's pattern cavity fitting over the core 15 now supported by the drag.

At the aforesaid "Mold-Off" Station V is a conveyor track 260 plus cooperating facilities for withdrawing from the two closed arms of each turret head 60 there coming to rest the now assembled mold made up of the drag 12, core 15 and cope 14 brought together as just described.

And cooperating with central machine 30's turret are further control means responsive to advancement by the turret of each arm head 60 from Station V to the first named "Drag-On" Station I for moving the upper and lower arms 61—62 on that head away from each other preparatory to repeating the mold assembly cycle outlined above.

Adaption of the drag flask 12, the cope flask 14 and the core box half 26 for the aforesaid handling by this central mold assembling machine 30 is effected by providing each of these mold parts with the side bars represented at 28 in Figs. 3, 4 and 6; attachment of these side bars 28 to the metal side walls of each drag, cope and core box being effected by welding or in other suitable manner as said co-pending Northington-Lasater application more fully describes.

In the installation reproduced by Figs. 1 and 7 hereof from the aforesaid Northington-Lasater application Serial 200,899 the central indexing machine 30 is surrounded by the five cooperating Stations I—II—III—IV—V above described and the various devices at those five stations are in turn surrounded by a main track 32 arranged in continuous loop or closed circuit and carrying a relatively large number of mold cars 33 coupled together into a continuous string or unbroken train; the original track layout of said co-pending application bending directly around cope shake out 47 as here represented.

All of the mold cars 33 in the named train are slowly advanced around track 32 in counter-clockwise direction, as indicated by the arrows of Fig. 1; such advancement being effected by drive mechanism 35. In the illustrative organization here shown, each car 33 comprises a flat top or platform somewhat larger than the drags 12 and assembled molds 12—14 to be carried thereon; each of these platforms is supported by four wheels that ride on the parallel rails of track 32 in conventional manner; and the drive mechanism 35 is positioned beneath track 32 and provided with means for engaging successive cars 33 and thereby pushing the entire train around the track at a speed selectable from about nine to twenty-four feet per minute, with a car speed of about fourteen feet per minute being typical.

Sand (designated at 13 in Figs. 3–4–5–6) of so called "green grade or other suitable material for charging the drags 12 and copes 14 and forming the cores 15 is supplied to Stations I, II and IV of the Fig. 1 installation from a sand plant 37 via a system of overhead conveyors (not here shown). Those conveyors carry the "green" sand prepared in plant 37 from elevator outlet 38 to receiving hoppers (not shown) provided at the aforesaid three stations as more fully disclosed by Northington-Lasater application Serial 200,899.

Spillage sand from said Stations I, II and IV is conveyed back to plant 37 by a system of underground return conveyors 43. These conveyors pick up sand not only from Stations I, II and IV but also from a casting shake out 45, a drag shake out 46 and a cope shake out 47; they return the so picked up sand to an elevator 48 which carries it from the underground level to the top of an elevated storage bin from which the sand is released as needed into mixing, moistening and other apparatus used to prepare it for redistribution to Stations I, II and IV via overhead conveyors 38.

The turret indexing requirements to be met

The installation reproduced by Fig. 1 hereof from the aforesaid Northington-Lasater application Serial 200,899 provides automatic mold assembling operation of "continuous" variety from which a high rate of casting production is possible.

In it the assembled molds 12—14 taken out if the central machine 30 at Station V are successively transferred to the portion of track that is adjacent to said station and there placed upon empty conveyor cars 33; and as these assembled molds travel further around the track 32 pouring thereof is accomplished in conventional manner prior to their approach to the cope shake out 47 identified with Station IV.

The operations which thereafter take place are fully described by the aforesaid Northington-Lasater application and hence will not again be described here.

Instead it will suffice to observe that the installation of Fig. 1 makes successive re-use of each of the drag flasks 12 and of each of the core boxes 26 and of each of the cope flasks 14 which are utilized in carrying out the complete mold assembling cycle, and also re-uses all of the sand utilized to charge the cope and drag flasks and to form the cores 15; and further that one installation organized as shown by Fig. 1 is capable of preparing, assembling and pouring the molds at the high rate of 240 per hour, thus giving an assembly time of only fifteen seconds for each mold.

This means that once every fifteen seconds a sand charged drag 12 is inserted into the upper arm of the turret head 60 at Station I, a core box 26 with finished core 15 therein is inserted into the lower arm of the turret head 60 at Station II, an empty core box 26 is withdrawn from the upper arm of the rolled over head 60 at Station III and then turned over and placed upon track 187 for return to Station II, a sand charged cope 14 is inserted into the empty upper arm of the turret head 60 at Station IV, an assembled mold 12—14 is withdrawn from the closed arms of the turret head 60 at Station V and prepared for transfer to a car 33 moving around track 32, and an indexing movement (of 72°) is thereupon imparted to central machine 30's turret thereby advancing all five arm heads 60 to the next stations in the direction of turret rotation.

The speed of mold-car movement around main track 32 is of course selected so that the aforesaid fifteen seconds is required for each car 33 to pass a given point; this assuring coordinated supply of the drag flasks 12 to the shake out 46 which leads to Station I, of empty cars 33 to the location of Station V at which assembled molds are transferred to those cars for pouring, of cope flasks 14 (from the poured molds) to the shake out 47 which leads to Station IV, and of cooled castings 10 (from the drags 12 passing beneath core box track 187) to the shake out 45 which leads to the receiver 341 (via conveyor 340) for the finished castings.

The assembling machine turret to be indexed

Attention next will be directed to central machine 30's turret 54 to which successive indexing rotations of 72° each are to be imparted. In the illustrative form here shown said turret 54 is of the same general design as is disclosed by the aforesaid Northington-Lasater application Serial 200,899.

Figure 8:
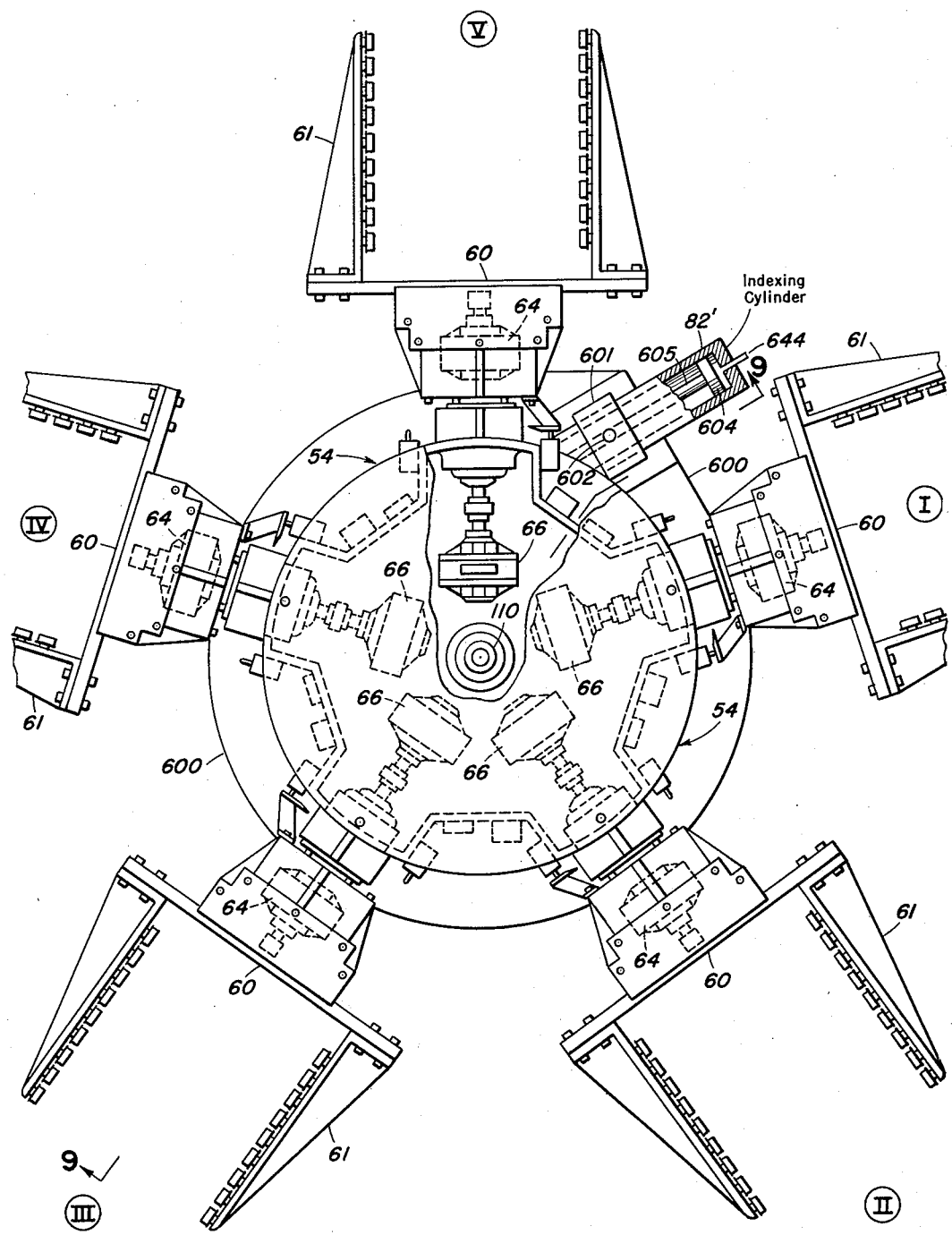
Figure 8 is a top plan view showing the central mold assembling machine of Figs. 1 and 7 to enlarged scale and indicating certain details of the five sets of flask and core box receiving arms with which said machine is provided.
Figures 10, 14:
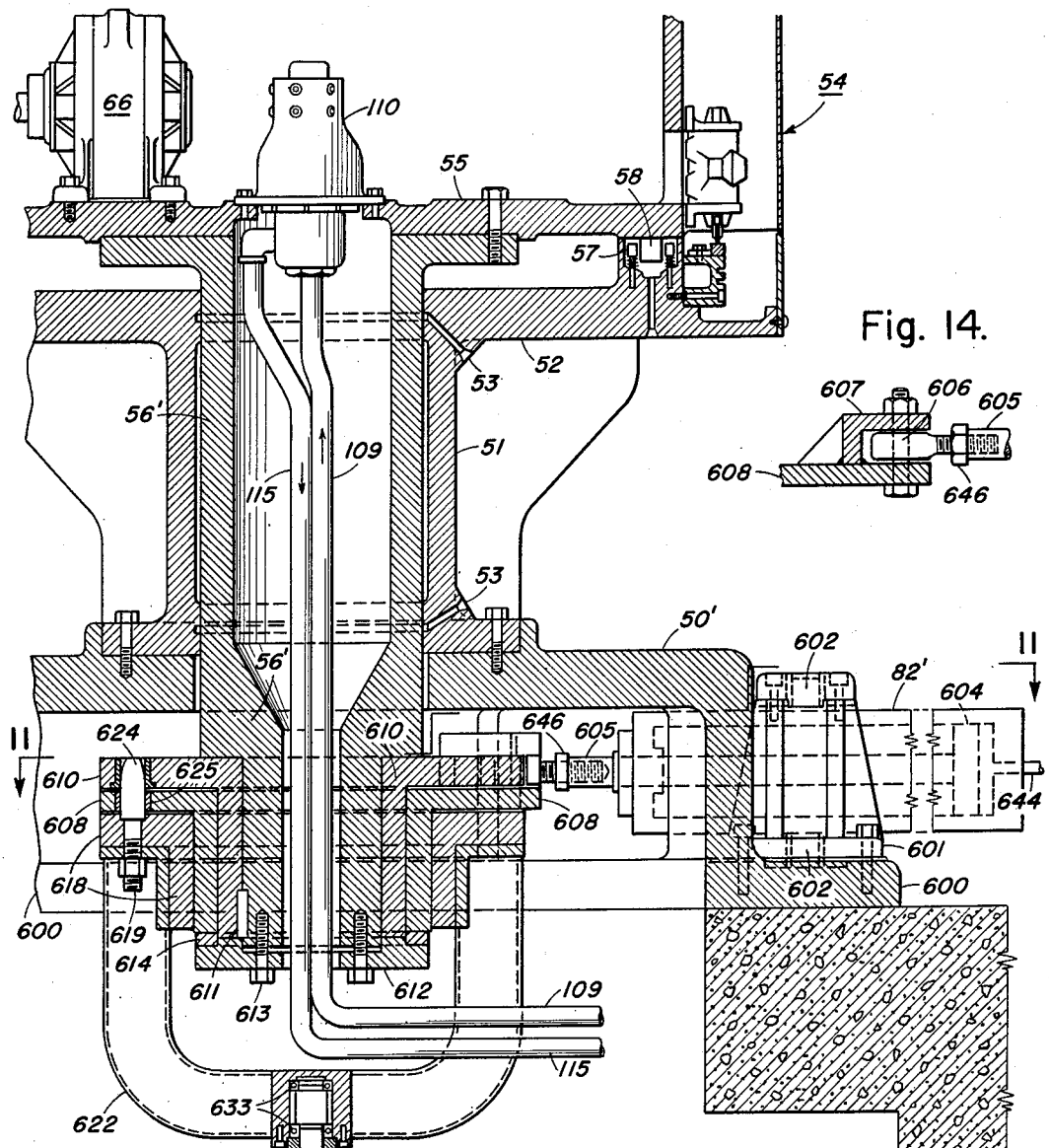
Figure 10 is a further enlarged showing of the new turret drive apparatus that is represented in Fig. 9.
Figure 14 shows the pivotal connection between the drive arm and the drive cylinder piston rod as viewed from line 14—14 of Fig. 11.

From Figs. 8—9—10 hereof it will be seen that the assembling machine 30 (Figs. 1 and 7) of which said turret forms a part comprises a stationary base generally indicated at 50'; a hollow pedestal 51 supported by the base 50' and extending upwardly therefrom into an outwardly extending table 52; and a flat plate member 55 that constitutes the floor of the turret and that is secured at its center to the top of hollow turret shaft 56', which shaft extends downwardly through the base pedestal 51 and is free to rotate relative to the pedestal 51 about a vertical axis.

The five arm heads 60 (Figs. 1, 7, 8) with which rotatable turret 54 is provided extend outwardly from the turret in radial directions which Fig. 8 shows to be equally spaced circumferentially of the turret periphery at intervals of 72° and which Fig. 9 shows to be in a horizontal plane. Each of these heads is provided with a first set of arms 61 and a second set of arms 62 organized as shown in Figs. 8—9. At times each head 60 is positioned with arm set 61 on top and arm set 62 on the bottom; at other times each head 60 is rolled over bringing arm set 62 on top and arm set 61 on the bottom.

Each of these five arm carrying heads 60 is provided with an arm-spacing motor 64 which serves to move arms 61 and 62 towards and away from each other, and also with a roll over motor 66 which serves to roll or turn the entire head 60 (and arms 61—62 carried thereby) back and forth through an angle of 180°. Such turning takes place in bearings 67 (Fig. 9) and is effected via the indicated direct coupling of motor 66 to the head; while movement of arm sets 61 and 62 towards and away from each other is effected by motor 64 via rack and pinion means 72—73 (Fig. 9) or the like.

Each of the five arm-spacing motors 64 and each of the five roll-over motors 66 is here shown as of the hydraulic type operable by pressure fluid made available to the turret 54 by main pressure line 109 (Figs. 9—10—11). Said line 109 feeds into central hydraulic coupling 110, and exhaust fluid from the motors 64 and 66 is discharged from the turret via main exhaust line 115. These two fluid lines pass downwardly through the hollow turret shaft 56' and then outwardly from the shaft bottom in the generally horizontal direction represented by Fig. 10.

From Figs. 1, 7, 8 it will be seen that in each "at rest" position of turret 54 the five arm heads 60 accurately align themselves with the five Stations I—II—III—IV—V surrounding the central indexing machine 30. The turret 54 of this machine is arranged to rotate (as already indicated) so that the arms carried by a given head 60 can be successively advanced from Station I to Station II to Station III to Station IV to Station V and back to Station I. During this rotation the vertical turret shaft 56' rides in upper and lower bearing portions of the base pedestal 51; Fig. 10 showing passages 53 through which these bearing surfaces can be suplied with lubricant.

The weight of the rotatable turret structure is carried by the top face of outer rim 57 upstanding from the pedestal table 52 as Figs. 9–10 show; said top face being engaged by a cooperating lower face of the rotatable turret plate 55. In order continuously to supply lubricant to these sliding surfaces use is made of rollers shown at 58 in Fig. 10 pressed by springs against the lower face of turret plate 55 and being immersed at their lower edges in a bath of oil.

*The improvements provided by present invention*

The improvements of our invention as depicted by the drawings hereof better the performance of the complete mold assembling installation earlier described by providing turret indexing apparatus which is more compact and rugged and which gives longer operating life plus greater reliability than the original drive mechanism shown by the aforesaid Northington-Lasater application Serial 200,899.

Said original drive mechanism utilized a first hydraulic cylinder (shown at 82 in said earlier application) for driving the turret 54 (via a pawl shown at 85 and toothed ratchet wheel shown at 68 in said earlier case) and also a second hydraulic cylinder (shown at 92 in said earlier application) for stopping the turret (via a bar shown at 95 in said earlier case) at the end of each drive stroke.

In the improved mechanism of the present invention both the drive and stop functions are accomplished by a single hydraulic cylinder shown at 82' in Figs. 1, 8, 9, 10, 11, 15, 16, 17, 18, 21 hereof. This main drive cylinder 82' is horizontally disposed, and cooperating with it is a vertically disposed second cylinder 620 effective through a yoke 622 to hold five drive pins 624 (most clearly shown by Figs. 10–11) in the upward or "engaged" position of Fig. 16 at times and in the downward or "released" position of Fig. 18 at other times.

In the particular organization represented said turret drive cylinder 82' is mounted on the main flange 600 of machine 30's base member 50' at some selected circumferential location here illustratively shown (Figs. 1 and 8) as lying between Stations V and I; attachment of the cylinder to the base flange being via a trunnion mount 601 which permits the cylinder to rock around top and bottom pins 602 (most clearly shown by Figs. 10–11) for a purpose later to become evident.

Movable lengthwise through cylinder 82' is piston 604 and attached piston rod 605 that is connected at its free end (left in the said drawing views) via head pin 606 and bracket 607 (best shown by Figs. 11 and 14) to a drive arm 608. The sleeve portion of said drive arm 608 surrounds the lower end of the hollow vertical turret shaft 56' as well as the sleeve portion of an indexing plate 610 that is fixedly keyed at 611 (Figs. 10 and 11) to said turret shaft 56'; the latter two parts further being secured together by retainer plate 612 attached to the lower end of turret shaft 56' via bolts 613 (Fig. 10).

Said drive arm 608 is free to rotate with respect to said indexing plate 610's sleeve portion therewithin and flange portion thereabove, and the bottom of the drive arm's sleeve portion derives support from a bearing ring 614 (Fig. 10) that is held in place by retainer plate 612. The drive arm 608 thus is rotatable with respect to hollow turret shaft 56' as the piston rod 605 of cylinder 82' moves from the withdrawn position of Fig. 15 to the extended position of Fig. 17 and vice versa; the range of said rotation on the part of drive arm 608 here being the 72° angular spacing between adjacent Stations I—II—III—IV—V around the central assembling machine 30.

The earlier mentioned drive pins 624 are circumferentially spaced (Figs. 11, 15, 17) around drive arm 608 and indexing flange 610 by said same 72° intervals as separate the locations of Stations I—II—III—IV—V (Figs. 1, 7, 8) around the central assembling machine 30. These drive pins are secured at their bases into a release plate 618 to the underside of which the aforesaid yoke 622 is bolted via nuts 619 turned upwardly on the threaded pin ends. In this way the pins 624, release plate 618 and yoke 622 are fastened together into a unitary structure which is free to move vertically with respect to the surrounded sleeve portion of drive arm 608 between the upper position of Fig. 16 and the lower position of Fig. 18.

Said pins 624 thus serve to lock drive arm 608 (rotatable by cylinder 82') with the indexing flange 610 (secured to turret shaft 56') when in said upper position, and they serve to break said locking engagement when the pins and yoke 622 are in the lower position. Suitable bushings 625 (Fig. 10) surround the drive pins 624 where same pass through drive arm 608, and other bushings 625 (Figs. 10–11) likewise are placed around said pins where same pass through the indexing flange 610.

The mentioned up and down movement on the part of drive pins 624 is effected by the auxiliary cylinder 620 mounted as shown by Fig. 9 on a pedestal 628 beneath the center of assembling machine 30. The piston 630 of this cylinder 620 communicates via piston rod 631 with the bottom of pin release yoke 622 through an adjustable coupling 632 and bearings 633; the latter permitting yoke 622 to turn with turret drive arm 608 back and forth through 72° without imparting this oscillation to rod 631 and piston 630, and if desired provision (not here shown) may be made for restraining the latter parts against such possible turning. An oil drip pan shown at 629 in Fig. 9 may with advantage be positioned around the top of pedestal 628 beneath cylinder 620.

Said yoke 622 is so disposed with respect to the fluid lines 109 and 115 (Fig. 10) serving the rotatable turret 54 that oscillation of the yoke through the aforesaid 72° range (from position of Fig. 15 to position of Fig. 17) is not interfered with by the horizontal runs (again see Fig. 10) of those fluid lines 109 and 115. This relationship becomes clearly apparent upon comparing Figs. 17 and 20 with Figs. 11, 15 and 19; and it permits said lines 109 and 115 to enter one side of yoke 622 Figs. 9–10–11 above the bottom thereof and then turn upwardly for passage through the hollow center of vertical turret shaft 56'.

Auxiliary cylinder 620 has a range of travel by its piston 630 which can best be seen by contrasting Fig. 16 with Fig. 18; the lower limit in this travel range being established when stop 635 on the bottom of piston 620 contacts the cylinder bottom as shown by Fig. 18, and the upper limit being established when pin release plate 618 has been moved upwardly against the bottom of drive arm flange 608 as shown by Fig. 16 (and also by Figs. 9–10). Best utilization of this travel movement on the part of drive pins is assured by setting adjustable coupling 632 (Fig. 10) so that when the piston 630 is at the bottom of its travel range the tops of drive pins 624 have been fully withdrawn from the indexing plate 610 as shown by Fig. 18, but have their top ends only slightly below the top surface of drive arm flange 608.

Admission of pressure fluid into port 636 of this cylinder 620 causes the piston 630 to move the yoke 622 and drive pins 624 upwardly towards the top position of Figs. 9, 10 and 16 wherein the pins lock drive arm 608 with indexing flange 610 and thereby permit transmission of indexing rotation from the main drive cylinder 82' to the machine turret 64; said upward movement being arrested when the top of pin release plate 618 contacts the bottom of drive flange 608. Similarly, admission of pressure fluid into port 637 causes downward movement by the yoke 622 and drive pins 624 towards the bottom position of Fig. 18 wherein the pins have disengaged drive arm 608 from indexing plate 610; said downward movement being arrested when stop member 635 contacts the bottom of cylinder 620.

The mentioned pressure fluid for operating auxiliary cylinder 620 is supplied thereto via conduits shown at 636' and 637' in Fig. 21 under the control of a solenoid valve SV13 and from suitable facilities diagrammed in Fig. 21 as including a fluid pressure line 276 and a fluid exhaust line 277. Said solenoid valve SV13 may have the internal construction diagrammed by Fig. 22. The valve stem there designated 114' is by energization of the solenoid shown at the left of the diagram withdrawn to the left as represented where it remains even after the left solenoid is deenergized; but upon energization of the right solenoid (with the left winding deenergized) the stem 114' is drawn to the right where it remains until the left winding is again energized (with the right winding deenergized).

With the stem at the left (Fig. 22) pressure fluid from line 276 flows as indicated by the small arrows out of the SV13 valve casing through the "first" port at the top left thereof to flow through conduit 637' to enter port 637 of cylinder 620 (Fig. 21) and thereby move piston 630 downwardly; the "second" port at the top right of Fig. 22 now being in communication with the exhaust line 277. When, however, the valve stem 114' is shifted to the right, pressure fluid from line 276 flows out of the SV13 valve casing through the top right or "second" port to pass through conduit 636' and enter port 636 of cylinder 620 and thereby move piston 630 upwardly; the top left or "first" port now being placed in communication with exhaust line 277.

In this way up and down movements of the drive pins 624 carried by yoke 622 are produced by auxiliary cylinder 620; said movements being under the control of electrical circuits and switches diagrammed by Fig. 21 (lower portion) and described at a later point herein.

Such up and down movements by the drive pins 624 are coordinated with the aforesaid forward and return oscillating movements (through range of 72°) which are imparted to drive arm 608 by main drive cylinder 82' whose piston rod 605 is connected with the arm via pin 606 (Figs. 11 and 14) as earlier explained. Admission of pressure fluid into port 640 of cylinder 82' causes piston 604 to draw rod 605 to the right thereby rotating drive arm 608 clockwise as viewed in Fig. 11 from the "start" position shown by Fig. 17 to the "stop" position shown by Fig. 15; said forward movement being arrested when an extension 608a of the drive arm brings arm inset 641 against the face of a stop member 642 that is fixed to the stationary base flange 600 of turret base 50' via an adjustable mount shown at 643 in Figs. 12, 13, 15, 16 and more fully to be described later.

Similarly, admission of pressure fluid into port 644 of cylinder 82' returns piston rod 605 to the left thereby rotating drive arm 608 counterclockwise as viewed in Fig. 11 from the "stop" position of Fig. 16 to the "start" position of Fig. 18; said return movement being arrested when piston 604 contacts a stop rim 645 in the cylinder's left end in the manner shown by Figs. 17–18. Proper alignment of the pins 624 in drive arm 608 with their mating holes in indexing flange 610 thereabove at the end of this return piston rod stroke is selected by adjusting (via nut 646) the coupling of drive pin 606 (Fig. 14) with the left end of piston rod 605, all in a manner later to be explained.

The mentioned pressure fluid for operating turret drive cylinder 82' is supplied thereto via flexible conduits shown at 640' and 644' in Fig. 21 under the control of a solenoid valve SV1 and from the facilities diagrammed in Fig. 21. Said solenoid valve may have the same internal construction as is diagrammed by Fig. 22 With stem 114' at the left, pressure fluid from line 276 flows out of the SV1 casing through the "first" port at the top left thereof to flow through conduit 644'' (Fig. 21) to enter port 644 of cylinder 82' and thereby move piston 604 to the left; the "second" port at the top right thereof now being in communication with exhaust line 277. When, however, the valve stem 114' is shifted to the right, pressure fluid from line 276 flows out of the SV1 valve casing through the top right or "second" port to pass through conduit 640' and enter port 640 of cylinder 82' and thereby move piston 604 to the right; the top left or "first" port now being placed in communication with exhaust line 277.

In this way forward and return oscillations of the drive pins 624 around the axis of turret drive shaft 56' are produced by main indexing cylinder 82'; said oscillating movements being controlled by the switches and electrical circuits which are diagrammed by Fig. 21 and described at a later point herein, and the fluid conduits 640' and 644' which serve cylinder 82' being flexible to accommodate the rocking of said cylinder around trunnion pins 602 that accompanies the arcuate movements of drive pin 606 between the forward position of Fig. 15 and the return position of Fig. 17.

Our invention further provides for slowing each forward movement of the drive arm 608 as same approaches said "forward" or "stop" position of Fig. 15 in indexing the turret 54 through each 72° of travel from the starting position of Fig. 17. This provision takes the form of a decelerating valve 648 which is disposed in the fluid line 644' interconnecting port 644 with solenoid valve SV1 via conduit 644'' as shown by Figs. 11, 12, 15, 17. For a purpose later to be made evident this valve 648 includes built in check means which at all times permit free flow of fluid through conduid 644'' in the direction of towards port 644 of the main drive cylinder 82'.

When stem 649 of said valve 648 is extended as shown in Fig. 17 the valve offers no retardation to fluid flow therethrough in either direction and the conduit 644' then is unobstructed and functions in the same manner as were valve 648 not present therein. It is under this condition (Fig. 17) that each forward indexing of the machine turret 54 is started upon admission of pressure fluid into port 640 of drive cylinder 82' and accompanying discharge of fluid from ahead of piston 604 out of cylinder port 644.

As, however, the limit of turret indexing travel is approached, valve stem 649 is contacted by a decelerating cam 650 carried by extension 608a of drive arm 608 as shown in Figs. 11, 12, 15, 17. This cam 650 tapers from a thin dimension at its leading edge (left in Fig. 11) to a thicker dimension at its trailing edge (right in Fig. 11), in consequence of which valve stem 649 is progressively depressed by the cam as drive arm 608 gets closer to the extreme forward or "stop" position represented by Figs. 11, 12 and 15. Such stem depression causes valve 648 to restrict fluid flow therethrough to a progressively increasing degree, and just before drive arm 608 reaches said full "stop" position of Fig. 11 the flow rate has been cut down to an exceedingly low value; the exact degree of such final cut down being selectable by an adjustable valve mount 651 here illustratively shown as utilizing an adjusting bolt 652 for moving valve 648 toward or away from decelerating cam 650.

This flow restriction in conduit 644' so introduced by decelerating valve 648 has the effect of slowing discharge of fluid out of cylinder port 644 ahead of piston 604 as the piston approaches the right end of cylinder 82'; such slowing being gradual at first and progressively increasing to the point where the speed of piston movement is close to zero just before inset 641 in drive arm 608 contacts stop member 642, as shown by Figs. 11 and 15. In consequence said stop member 642 arrests further movement of drive arm 608 and machine turret 54 without undue strain or any tendency for overtravel on the part of the turret and the comparatively heavy parts carried thereby. Said parts carried by turret 54 include the five arm heads shown at 60 in Fig. 8.

Accurate alignment of these arm heads 60 with the cooperating apparatus at the five stations shown at I—II—III—IV—V (Figs. 1, 7, 8) in the aforesaid "stop" positions of the turret is assured through appropriate adjustment of the earlier mentioned mount 643 for stop member 642. As shown by Figs. 11 and 13, this mount utilizes a base plate 653 fixedly secured to flange 600 of the assembling machine base 50' and having two rows of guide studs 654 that extend upwardly through cooperating slots 655 in mount plate 643, which slots are disposed concentric to the circumference of machine base flange 600. Behind the mount plate 643 are bolts 656 extending through web 657 (integral with base plate 653) with their ends bearing against said stop mount 643.

A turning of these adjusting bolts 656 inwardly moves mount 643 circumferentially of turret shaft 56' in the counterclockwise direction (Fig. 11) to effect earlier stopping of drive arm 608; while a turning of bolts 656 outwardly of web 657 permits stop member 642 to be repositioned clockwise along base member 653 to effect later stopping of drive arm 608 and the machine turret 54 indexed thereby. Once the proper position has been found stop member 643 is securely clamped therein through a tightening of guide studs 654.

*Switches and circuits for governing indexing of turret*

Associated with the main drive cylinder 82' are "forward" and "return" limit switches shown at A' and B' in Figs. 11 and 21. When turret drive arm 608 reaches the extreme forward or "stop" position of Figs. 11 and 15, portion 660 thereof has the position shown by Fig. 11 and effects closure of limit switch A', which is of the normally open type. Through the control circuits of Fig. 21 the so closed switch picks up relay RA (over conductor 320) and thereby sets up a sequence of actions (later to be explained) that cause return of drive arm 608 to the "start" position of Fig. 17.

Upon arrival of drive arm 608 in said "start" position, portion 660 thereof engages the second limit swtich shown at B' in Figs. 11 and 21. This second limit switch also is of the normally open type and said engagement closes it to effect pick up (over conductor 311) of relay RB and thereby initiates actions (later to be explained) which at a proper time produce forward advancement of drive arm 608 to the "stop" position of Fig. 15.

Associated with the auxiliary cylinder 620 are "up" and "down" limit switches shown at 662 and 663 in Figs. 10 and 21 and both being of the normally open type. When yoke coupling 632 reaches the extreme top position of Figs. 10 and 16, portion 664 has the position shown by Fig. 10 and effects closure of limit switch 662. Through the control circuits of Fig. 21 the so closed switch energizes right winding 286' of solenoid valve SV1' with results later to be explained.

*Other apparatus comprised by control system of Fig. 21*

Fig. 21 hereof constitutes a reproduction of Fig. 59 of the aforesaid copending Northington-Lasater application Serial 200,899 filed December 15, 1950, on "Apparatus and Technique for Assembling Foundry Molds" and modifies same by a showing (at the bottom thereof) of the new turret indexing control facilities that are involved by the present invention.

Fig. 21 hereof thus repeats from the earlier case Fig. 59 the solenoid valves SV2, SV3, SV4, SV5, SV7 and SV8 plus the drag carriage cylinder 171 at Station I plus the core carriage cylinder 200 at Station II plus the core box manipulator 220 and turn over motors 211—212 at Station III plus the cope carriage cylinder 250 at Station IV plus limit and interlock switches C, D, E, F, G, H, J, K, L, M, N, O, R, S, T, U, W, X, Y plus the timer 321 plus system relays RA and RB plus the switch 278 through which control potential is impressed between conductors 280 and 281 plus conductors 293 and 296 associated with the relay contacts 283 and 284 plus interlock conductors 306 and 315 together with interlock break and interlock short out switches 307 and 308 plus the earlier mentioned fluid pressure and exhaust lines 276 and 277.

The new elements added to Fig. 21 in accordance with the present invention comprise the main drive cylinder 82' for indexing the assembling machine turret 54 together with solenoid valve SV1' for controlling admission of pressure fluid thereto plus limit switches A' and B' associated with main cylinder 82' together with limit switches 662 and 663 associated with auxiliary cylinder 620.

Said limit switches form part of the indicated electrical circuits that are energized from the control potential appearing between the two vertically drawn supply conductors 280 and 281; and in the system shown by Fig. 21 said potential is applied to those conductors 280—281 via switch 278 from any suitable power source, such as a commercial 110 volt lighting circuit of either the alternating current or the direct current type.

*Operation of complete turret indexing facilities here disclosed*

How the complete mold assembling system incorporating our turret drive improvements operates will have become more or less apparent from the foregoing description of the various component parts and devices which make up that system. It is first of all to be observed that the fundamental functions of mold assembly and casting production are little changed from those performed by the original installation disclosed by copending Northington-Lasater application Serial 200,899 earlier referred to.

But by reason of the turret indexing improvements of the present invention certain limitations have been removed from said earlier system and certain advantages have been secured therefor.

The limitations mentioned arise from the facts that the turret drive facilities of said earlier system included no provision for gradually decelerating movement of the heavy turret 54 at the end of each indexing stroke; that said earlier facilities thus imposed heavy strains on the turret stopping means with attendant shortening of operating life; and that the earlier indexing facilities left much to be desired in regard to adjusting final stoppage of the turret arms in accurate register with the several stations that surround the mold assembling machine.

The new turret indexing facilities here shown overcome the foregoing limitations by operating in the new and advantageous way now to be described.

Assume first that the indexing cylinder 82' is retracted (as shown by Figs. 8, 9, 10, 11, 15 and 16) after having imparted a 72° indexing movement to the assembling machine turret 54. Limit switch A' is now closed thereby completing for relay RA a pick up circuit shown by Fig. 21 as including conductor 320. Thus energized relay RA picks up its contact 283 to set up (over conductor 293) circuits for actuating the apparatus (shown by Fig. 1) at Drag-On Station I (via valve SV2), at Core-On Station II (via valve SV3), at Core Box Turn Over Station III (via valve SV7), at Cope-On Station IV (via valve SV4) and at Mold-Off Station V (via valve SV5), and also to energize timer 321 via conductors 293 and 312.

After an elapsed time (preferably of the order of a few seconds) timer 321 transmits energizing current to the right winding 666 of solenoid valve SV13 causing admission of pressure fluid through conduit 637' into top port 637 of auxiliary cylinder 620 with resultant downward movement by piston 630 and yoke 622 connected thereto (via coupling 632). Said downward movement withdraws all five drive pins 624 out of the indexing flange 608 and into the position shown by Fig. 18 wherein the tops of said drive pins continue in engagement with the drive arm 608.

When cylinder piston 630 reaches the end of its downward stroke (Fig. 18), part 664 on coupling 632 closes limit switch 663 (see Fig. 10) and thereby effects energization of the left winding 294' of solenoid valve SV1' over conductor 667 of Fig. 21. Valve SV1' now admits pressure fluid through conduit 644" into the end (right) port 644 of main drive cylinder 82'; the fluid flowing freely in this direction through decelerating valve 648 (via the earlier mentioned by pass means) even though the stem 649 thereof continues to be depressed, as shown by Figs. 11 and 15. Said admitted fluid pushes cylinder piston 604 to the left at maximum speed thereby moving rod 605 to extended stroke and rotating drive arm 608 counterclockwise (as viewed from the top) from the advanced position of Fig. 15 to the returned position of Fig. 17.

Arm extension 608a accordingly moves counterclockwise away from stop member 642 carrying cam 650 out of contact with decelerating valve stem 649 and thus fully opening valve 648 for unobstructed transmission of fluid in either direction. Rotated counterclockwise with drive arm 608 are the five drive pins 624 plus the pin release plate 618 secured to the bases thereof plus the yoke 622; but since these pins now are withdrawn (per Fig. 18) from their mating holes in indexing plate 610, the turret 54 and its drive shaft 56' remain stationary.

When main drive cylinder 82' reaches its extended stroke (as shown by Figs. 17–18), part 660 on drive arm 608 engages limit switch B' (see Figs. 11 and 21) and closes same thereby energizing relay RB over conductor 311 of Fig. 21. Relay RB picks up contact 284 setting up for the left winding 668 of solenoid valve SV13 an energizing circuit which extends from the first supply conductor 280 through closed relay contact 284, conductor 296, the SV13 winding 668, interlock conductor 315, closed switch 307, interlock conductor 306, interlock switches W, L, M, N, X, J, F, G, E and D, and conductor 316 to the second supply conductor 281.

The circuit so set up for valve SV13 winding 668 is completed when and only when the apparatus at each and every one of the five Stations I—II—III—IV—V has been fully prepared for another indexing movement on the part of assembling machine turret 54. Attainment of such preparation is accomplished by closure of all of the interlock switches named above. When this happens energizing current flows through said left winding 668 of solenoid valve SV13 and causes admission of pressure fluid through conduit 636' into bottom port 636 of auxiliary cylinder 620 with resultant upward movement by piston 630 and yoke 622 connected thereto via coupling 632.

Said upward movement shifts all five drive pins 624 from the withdrawn position of Fig. 18 to the engaged position of Figs. 16 and 10 wherein those pins are reinserted into mating openings in the indexing flange 610; said reinsertion locking the drive arm 608 to the turret drive shaft 56' via said indexing flange. Drive arm 608 now has the position of Figs. 17 and 20, which is displaced 72° counterclockwise from the previous rotative position of Figs. 11, 15 and 19.

In completing its upward stroke cylinder piston 630 brings part 664 on coupling 632 into engagement with limit switch 662 as shown in Fig. 10, thereby closing the switch to effect energization of the right winding 286' of solenoid valve SV1' over a circuit shown by Fig. 21 as including conductor 669. Such energization causes valve SV1' to admit pressure fluid through conduit 640' into the left port 640 of main drive cylinder 82' and thereby initiate an indexing movement by turret 54.

The pressure fluid admitted on the left side of piston 604 creates a force on piston rod 605 which is transmitted through pin 606 and bracket 607 (Fig. 14) to the drive arm 608, thence through the drive pins 624 and indexing flange 610 to the drive shaft 56' and base plate 55 of the machine turret 54. The direction of this force is to the right in the drawing views hereof, and it serves to rotate all of the parts last named clockwise through an angular distance of 72°, thereby advancing all five arm heads 60 on the turret 54 (see Fig. 8) to the next stations around central machine 30 (see Figs. 1 and 7). In consequence, the head 60 initially at Station I is moved on to Station II, the head initially at Station II is moved on to Station III, and so on.

As the drive piston 604 makes this forward stroke (to the right in the drawings hereof), fluid is forced thereahead out of cylinder 82' via end port 644, conduit 644' and decelerating valve 648. At the beginning of the forward stroke, valve 648 permits free flow of the fluid therethrough and the drive arm 608 and turret 54 are accordingly moved at full speed until cam 650 on arm extension 608a (see Fig. 17) comes into contact with valve stem 649. When this happens the depression of stem 649 by the cam causes valve 648 to throttle the flow of fluid leaving cylinder port 644, thus slowing or decelerating cylinder and machine turret speed and preparing the heavy moving parts (including arm heads 60) for final stopping in their new positions of alignment with Stations I—II—III—IV—V (Figs. 1 and 7). The fluid pressures developed in the right end of cylinder 82' (and in conduit 644' leading to valve 648) during this deceleration may be comparatively high; however the parts involved are designed to withstand them easily and this novel slowing arrangement is found to function reliably and satisfactorily in all respects.

In approaching the extreme end of said forward indexing stroke the machine turret 54 and its driving parts are by the above action of decelerating valve 648 slowed below normal traverse speed progressively and to such final extent that part 641 on drive arm extension 608a moves against stop member 642 with relatively little shock and thereby brings the machine turret 54 to a complete and precision stop with the arm heads 60 accurately aligned with their new station locations.

This newly indexed position (72° ahead of the previous one) of the machine turret 54 is positively held during all of the time that the machine arms 60 are being loaded and unloaded. Such positive holding is effected by continuing the application of pressure fluid to the left port 640 of main drive cylinder 82'; once this application via conduit 640' has been started by solenoid valve SV1', it continues until the later time when right winding 294' of said valve is again energized.

As meanwhile the turret indexing movement just described reaches the "stop" position shown by Figs. 10 and 15 the accompanying closure of limit switch A' picks up relay RA (Fig. 21) which via contact 283 and conductor 293 sets up circuits for actuating the apparatus at the five stations around machine 30, and also energizes timer 321; after a few seconds said timer energizes winding 666 of solenoid valve SV13 causing auxiliary cylinder 620 to withdraw drive pins 624 down out of the indexing flange 610 as shown by Fig. 18; and in so moving down with piston 630 part 664 closes limit switch 663 to energize valve SV1' causing main cylinder 82' to return drive arm 608 counterclockwise through 72° to the position of Fig. 17 in readiness for imparting another indexing movement (of 72°) to machine turret 54.

The cycle of operation involved by such further indexing movement duplicates the one hereinbefore described, and detailed description thereof need therefore not be repeated.

*Extended systems likewise may be benefitted*

More extended systems likewise may be benefitted by this invention. If desired the complete installation shown by Fig. 1 hereof may be supplemented by cooling loop and cope stripper facilities organized as disclosed by a second copending application Serial 232,524 filed June 20, 1951 in the names of John A. Lasater and Thomas A. Deakins with title of "Cope Stripper and Cooling Loop for Mold Assembling Mechanism."

In accordance with that second copending application Serial 232,524: (a) the outer mold car track shown at 32 by Fig. 1 hereof is opened at cope shakeout 47 and extended into a cooling loop (shown at 360 by Fig. 1A of said application) through the added track length on which the mold cars 33 pass before returning for repassage beside cope shakeout 47 on the way to car drive mechanism 35 and casting shakeout 45; and (b) the return portion of this cooling loop has positioned thereover a length of cope stripper track (shown at 362 by Figs. 1A, 8, 9 and 10 of said application) organized to lift the copes 14 away from the drags 12 on the moving cars 33 and to convey those lifted copes directly upon cope shakeout 47 without requirement for any assistance from an operator.

The new turret drive facilities of the present invention are directly applicable to the central assembling machine 30 of an extended system wherein said cope stripper and cooling loop facilities are included as taught by said second copending application Serial 232,524; and the turret drive means of our present invention operate in said extended system in the same manner as disclosed and described therein.

The same observation applies to the installation shown by Fig. 1 hereof when same is supplemented at Station V by automatic takeoff and mold lowering facilities organized as disclosed by a third copending application Serial 243,688 filed August 25, 1951 in the names of John A. Lasater and Thomas A. Deakins with title of "Automatic Takeoff and Lowering of Assembled Molds from Assembling Mechanism to Conveying Cars."

In accordance with that third copending application Serial 243,688: (a) the length of straight mold track shown at 260 by Fig. 1 hereof is replaced by a curved section of track (shown at 260' by the drawings of said application) along which the assembled molds taken from machine 30 at Station V are passed to a location over car track 32 which is in advance of Station V and in which each mold has been turned in the direction of said track 32; (b) each of these turned molds then is automatically lowered upon an empty car 33 passing therebeneath; and (c) the previous need for an operator at Station V is in this way eliminated.

The improved turret indexing facilities of the present invention obviously are directly applicable to the central assembling machine 30 of an extended system wherein said automatic mold takeoff and lowering facilities are included as taught by said third copending application Serial 243,688.

*Summary*

The improved turret indexing facilities herein disclosed therefore have practical utility of a high order and the specific driving and decelerating and stopping functions described therefor are accordingly to be interpreted in an illustrative rather than in a restrictive sense.

It will thus be seen that our invention betters the performance of a complete mold assembling installation of the aforesaid mechanized type; that our inventive improvements provide such an installation with improved means for indexing the turret of the central assembling machine following withdrawal of each assembled mold therefrom; that our invention has provided unitary indexing mechanism which serves not only to drive the turret in the manner aforesaid but also to slow the end of each drive movement thereof for final stopping of the turret arms in accurate register with the several stations which surround the mold assembling machine; and that our invention has provided for interlocking the new turret drive facilities with the apparatus at each of the installation's individual stations in such manner that indexing movement can be imparted to the turret only when each and every one of said stations is in complete readiness therefor.

Our inventive improvements are therefore extensive in their adaptation and hence are not to be restricted to the specific form herein disclosed by way of illustration.

What we claim is:

1. In a mold assembling installation, the combination of a turret having an elongated drive column rotatable about its major axis with at least one mold receiving means secured to one end of the drive column and provided with an operating motor; means to intermittently rotate said turret through equal predetermined angular increments including a clutch means encompassing the other end of said drive column in coaxial relation therewith and movable longitudinally thereof between an engaged position where it is in mechanical engagement with said drive column and an idle position where it is free of such mechanical engagement; motor means connected to said clutch to effect the aforesaid longitudinal movement; a drive member journaled to said drive column and connected to said clutch in a manner to permit relative longitudinal movement axially thereof but prevent relative rotary movement between the clutch and drive member; indexing motor means connected to said drive member and effective to oscillate the same about said axis; stop means effective to limit the oscillatory movement of said drive member to the aforesaid equal predetermined angular increments; means providing said clutch means with a radial opening therein at a point spaced from said other end of said drive column and substantially greater than the angular extent of said oscillating movement; and conduits communicating with the operating motor of said mold receiving means for supplying a driving medium to said motor, said conduits extending axially of said drive column to said other end thereof and thence outwardly through said radial opening.

2. In apparatus of the type described, a stationary frame, turret means rotatably received within said frame for rotation about a defined axis, said turret means including a generally elongated member which is disposed substantially co-axial of said defined axis and which has at one end thereof a plurality of mold receiving means spaced at equal angular increments about said axis and which has at the other end thereof a radially extending flange positioned inwardly of said other end and provided with openings corresponding in number and spacing to said mold receiving means, motor operated turret drive means effective to rotate said turret in steps equal to the angular spacing of said mold receiving means and including a drive member rotatably journaled about said elongated member adjacent its other end and in juxtaposition to said flange, motor means connected to said drive member and effective to oscillate the same through an arc equal to the angular spacing of said mold receiving means, stop means operable to limit said arcuate movements to said angular spacing, engaging means connected to said drive member to rotate therewith while being movable relative thereto longitudinally of the axis of said elongated member between predetermined positions, motor means connected to said engaging means to move the same to and from said predetermined positions, said engaging means being positionable within at least one of the openings in the flange when in one of said predetermined positions to prevent relative rotation between the drive member and the turret and entirely free of said openings when in the other of said positions to permit relative rotation between said drive means and said turret.

3. In apparatus of the type described, a stationary frame, turret means rotatably received within said frame for rotation about a defined axis, said turret means including a generally elongated member which is disposed substantially co-axial of said defined axis and which has at one end thereof a plurality of mold receiving means spaced at equal angular increments about said axis and which has at the other end thereof a radially extending flange provided with openings corresponding in number and spacing to said mold receiving means, motor operated turret drive means effective to rotate said turret in steps equal to the spacing of said mold receiving means and including a drive member rotatably journaled about said elongated member adjacent its said other end and in juxtaposition to said flange, a double acting fluid operated motor secured to said frame and operatively connected to said drive member to oscillate the same through an arc equal to the angular spacing of said receiving means, variable restrictor means engaged by said drive member in a manner to increasingly restrict the flow of exhaust fluid from said motor as said drive member approaches one of its extreme positions, engaging means telescoped over said drive member and connected thereto to rotate with said drive member while being removable relative thereto longitudinally of the axis of said elongated member between predetermined positions, motor means connected to said engaging means to move the same to and from said predetermined positions, said engaging means including means positionable within at least one of the openings in the flange when in one of said predetermined positions to prevent relative rotation between the drive member and the turret and entirely free of said openings when in the other of said positions to permit relative rotation between said turret and drive member.

4. An apparatus as defined in claim 3 wherein the fluid motor is of the piston type and is pivoted to the frame member about a pivot point disposed along a line generally parallel to the defined axis to provide for the arcuate movement of the connection between the drive member and the motor.

5. In apparatus of the type described, a stationary frame, turret means rotatably received within said frame for rotation about a defined axis, said turret means including a generally elongated member which is disposed substantially co-axial of said defined axis and which has at one end thereof a plurality of mold receiving means spaced at angular increments about said axis and which has at the other end thereof a radially extending flange positioned inwardly of said other end and provided with openings corresponding in number and spacing to said mold receiving means, motor operated turret drive means effective to rotate said turret in steps equal to the spacing of said mold receiving means and including a drive member rotatably journaled about said elongated member adjacent its said other end and having a radially extending portion complementary to said flange and juxtaposed thereto, the radially extending portion of said drive member having openings corresponding to the openings of said flange, motor means connected to said drive member and effective to oscillate the same through an arc equal to the angular spacing of said motor receiving means, stop means operable to limit said arcuate movement to said angular spacing, cylindrical engaging means telescoped over said drive means and movable with respect thereto longitudinally of said elongated means between predetermined positions, said engaging means having projections extending therefrom and received within the openings in said drive member and said flange when in one of said predetermined positions and said driving member only when in the other of said predetermined positions, and motor means operatively connected to said engaging means effective to move the same to and from said predetermined positions.

6. In apparatus of the type described, a stationary frame, turret means rotatably received within said frame for rotation about a defined axis, said turret means including a generally elongated member which is disposed substantially co-axially of said defined axis and which has at one end thereof a plurality of mold receiving means spaced at equal angular increments about said axis and which has at the other end thereof a radially extending flange positioned inwardly of said other end and provided with openings corresponding in number and spacing to said mold receiving means, motor operated turret drive means effective to rotate said turret in steps equal to the angular spacing of said mold receiving means and including a drive member rotatably journaled about said elongated member adjacent its other end and in juxtaposition to said flange, motor means connected to said drive member and effective to oscillate the same through an arc equal to the angular spacing of said mold receiving means, stop means operable to limit said arcuate movements to said angular spacing, engaging means connected to said drive member to rotate therewith while being movable relative thereto longitudinally of the axis of said elongated member to and from an idle and a drive position, motor means connected to said engaging means to move the same to and from said positions, said engaging means including means that is positioned within at least one of the openings in the flange when in said drive position to prevent relative rotation between the drive member and the turret and is entirely free of said openings when in the idle position to permit relative rotation between said drive means and said turret, control means for the second mentioned motor means operable by said drive mechanism upon reaching one extreme position to activate said motor means for movement of the engaging means to the idle position and upon reaching the other extreme position to activate said motor means for movement of the engaging means to the drive position.

7. In apparatus of the type described, a stationary frame, turret means rotatably received within said frame for rotation about a defined axis, said turret means including a generally elongated member which is disposed substantially co-axially of said defined axis and which has at one end thereof a plurality of mold receiving means spaced at equal angular increments about said axis and which has at the other end thereof a radially extending flange positioned inwardly of said other end and provided with openings corresponding in number and spacing to said mold receiving means, motor operated turret drive means effective to rotate said turret in steps equal to the angular spacing of said mold receiving means and including a drive member rotatably journaled about said elongated member adjacent its other end and in juxtaposition to said flange, motor means connected to said drive member and effective to oscillate the same through an arc equal to the angular spacing of said mold receiving means, stop means operable to limit said arcuate movements to said angular spacing, engaging means connected to said drive member to rotate therewith while being movable relative thereto longitudinally of the axis of said elongated member between predetermined positions, motor means connected to said engaging means to move the same to and from said predetermined positions, said engaging means being positionable within at least one of the openings in the flange when in one of said predetermined positions to prevent relative rotation between the drive member and the turret and entirely free of said openings when in the other of said positions to permit relative rotation between said drive means and said turret, and control means for the first mentioned motor means operated by said engaging means upon reaching one of its predetermined positions to activate said motor means to move the drive member to one of its extreme positions and upon reaching the other of its predetermined positions to activate said motor means to move the drive member to the other extreme position.

8. In apparatus of the type described, a stationary frame, turret means rotatably received within said frame for rotation about a defined axis, said turret means including a generally elongated member which is disposed substantially co-axially of said defined axis and which has at one end thereof a plurality of mold receiving means spaced at equal angular increments about said axis and which has at the other end thereof a radially extending flange positioned inwardly of said other end and provided with openings corresponding in number and spacing to said mold receiving means, motor operated turret drive means effective to rotate said turret in steps equal to the angular spacing of said mold receiving means and including a drive member rotatably journaled about said elongated member adjacent its other end and in juxtaposition to said flange, motor means connected to said drive member and effective to oscillate the same through an arc equal to the angular spacing of said mold receiving means, stop means operable to limit said arcuate movements to said angular spacing, engaging means connected to said drive member to rotate therewith while being movable relative thereto longitudinally of the axis of said elongated member to and from an idle and a drive position, motor means connected to said engaging means to move the same to and from said positions, said engaging means including means that is positioned within at least one of the openings in the flange when in said drive position to prevent relative rotation between the drive member and the turret and entirely free of said openings when in the idle position to permit relative rotation between said drive means and said turret, control means for said first mentioned motor means operated by said engaging means upon reaching its idle position to activate said motor means to move the drive member to one of its extreme positions and upon reaching its drive position to activate said motor means to move the drive member to its other extreme position and control means for the second mentioned motor means operable by said drive mechanism upon reaching said one extreme position to activate said motor means for movement of the engaging means to its drive position and upon reaching said other extreme position to activate said motor means for movement of the engaging means to the idle position.

References Cited in the file of this patent

UNITED STATES PATENTS

| | | |
|---|---|---|
| 1,570,658 | Wickland et al. | Jan. 26, 1926 |
| 2,049,967 | Luton | Aug. 4, 1936 |
| 2,535,335 | Thevenin | Dec. 26, 1950 |

FOREIGN PATENTS

| | | |
|---|---|---|
| 357,025 | Great Britain | Sept. 17, 1931 |